United States Patent
Al-Araji et al.

(10) Patent No.: US 6,556,239 B1
(45) Date of Patent: Apr. 29, 2003

(54) DISTORTION MONITORING SYSTEM FOR CATV TRANSMISSION NETWORKS

(75) Inventors: Saleh R. Al-Araji, Alpharetta, GA (US); Paul E. Quesenberry, Marietta, GA (US); Herman A. Kruse, Winder, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/545,650

(22) Filed: Apr. 10, 2000

(51) Int. Cl.$^7$ .............. H04N 17/00; H04N 7/16
(52) U.S. Cl. ...................... 348/192; 725/143
(58) Field of Search .............. 348/192, 193, 348/607; 725/143, 148, 127; H04N 17/00, 7/16

(56) References Cited

U.S. PATENT DOCUMENTS

| | | | | |
|---|---|---|---|---|
| 5,233,418 A | * | 8/1993 | Gumm et al. | 348/181 |
| 5,473,361 A | * | 12/1995 | Penney | 725/143 |
| 5,874,992 A | * | 2/1999 | Caporizzo | 348/192 |

FOREIGN PATENT DOCUMENTS

| | | |
|---|---|---|
| EP | 0210007 | 1/1987 |
| EP | 0746167 | 12/1996 |
| FR | 2694813 | 2/1994 |
| JP | 62007280 | 1/1987 |
| JP | 08056193 | 2/1996 |
| WO | WO 96/41484 | 12/1996 |

OTHER PUBLICATIONS

"Sliding FFT Computes Frequency Spectra in Real Time," EDN Electrical Design News, Cahners, Publishing Co., Newton, Massachusetts, vol. 33, No. 20, Sep. 29, 1988, pps 161–166, 168, 170, XP000111000.

"Spectral Analysis of IS–Radar Signal and Elimination of Clutter Noise," Institute of Electrical Engineers, Stevenage, GB, Ogura et al., Database Accession No. 1480480, XP002182210 abstract, vol. E62, No. 10, pps. 691–692.

* cited by examiner

*Primary Examiner*—Michael Lee
(74) *Attorney, Agent, or Firm*—Hulbert J. Barnhardt, III; Kenneth M. Massaroni; Shelly L. Couturier (57) ABSTRACT

Systems and methods for a distortion monitoring system that detects an abnormal amount of signal distortion occurring in a transmission system. The distortion monitoring system includes a system amplifier section for amplifying and coupling an input signal to provide first and second outputs and a distortion monitoring section for processing the second output. The amount of distortion present is represented by an output from the distortion monitoring section of the system. In one embodiment, the distortion monitoring section can include an envelope detector for receiving the second output signal, a lowpass filter coupled to the envelope detector for cutting off frequencies below the Nyquist rate, and a voltage amplifier coupled to the lowpass filter for amplifying the signal. An analog to digital converter coupled to the voltage amplifier digitizes the signal, a memory buffer coupled to the analog to digital converter captures the digital data from the analog to digital converter, and a digital signal processor extracts the converted signal. In yet another embodiment, the digital signal processor includes an on-chip memory. A status monitor coupled to the output of the distortion monitoring section provides for monitoring the output signal.

25 Claims, 6 Drawing Sheets

DISTORTION MONITORING SYSTEM FOR CATV TRANSMISSION NETWORKS

FIELD OF THE INVENTION

This invention relates to cable television systems, and more particularly, to monitoring distortion in a cable television system.

BACKGROUND OF THE INVENTION

Figure 1:
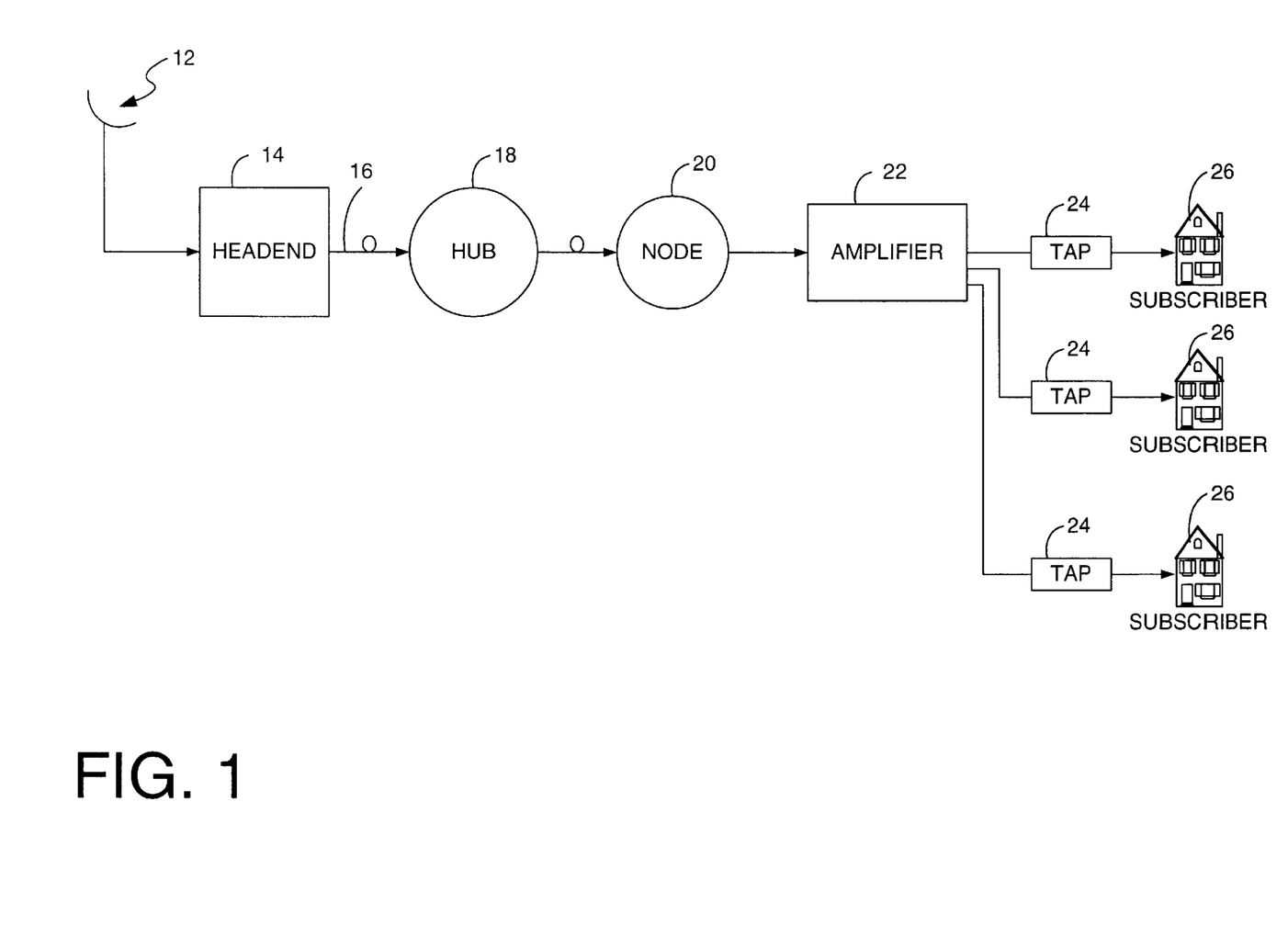
FIG. 1 shows a block diagram of a conventional cable television system.

Cable television (CATV) systems provide content to subscribers, typically by routing signals from a satellite to a subscriber utilizing communication systems such as fiber optic cables and/or coaxial cables. FIG. 1 shows an example of a cable television system 10 including a satellite 12 transmitting signals to a headend 14 that receives and demodulates the signals to baseband. The baseband signal is transmitted over the communication system after conversion to an optical signal or a radio frequency. As illustrated, a fiber optic system 16 transports the optical signal to a hub 18 and then onto a node 20. Amplifiers 22 are normally utilized in the system to increase the signal. Inserted in the communications system are taps 24 to tap off the signals to subscribers 26.

Conventionally, distortion in CATV systems is monitored by utilizing a pilot signal. A pilot signal of a specific frequency is transmitted through the network and the level of this pilot signal is detected at the input and output of the amplifier, such as amplifier 22 shown in FIG. 1. By examining these levels, a determination is made whether the CATV signal level is acceptable. Based on this, an excessive signal level can be detected which indirectly indicates an increase in signal distortion.

In the current method, if a distortion results due to disturbances at a frequency different from the pilot frequency, it may not be possible to detect that distortion. Typically, system amplifier hybrids are driven near the maximum signal point (i.e. the crash point) to obtain the highest output level. As a result, a small change in output level can cause a large change in distortion. Thus, to maintain peak performance of an overall system requires close monitoring of distortion.

Additionally, if distortion is discovered, it is measured at the output of the system. Currently, the location or component that originated the distortion cannot be determined.

Another method currently employed to monitor distortion is by the use of a spectrum analyzer placed at the end of the transmission. However, with this approach diagnosing the source of the problem has proven difficult.

Accordingly, a need exists for systems and methods for monitoring distortion to detect an abnormal increase of signal distortion occurring anywhere in the transmission system while system output.

SUMMARY OF THE INVENTION

This invention addresses the prior problems and provides for systems and methods for a distortion monitoring system adapted to detect an abnormal amount of signal distortion occurring anywhere in a transmission system.

The increase of channel loading in a CATV system, in particular, the addition of digital channels at the upper spectrum as well as the transmission of video signals over fiber links, necessitate the need for a distortion monitoring system to detect an abnormal increase of signal distortion occurring in the CATV system.

This invention includes a system amplifier section for amplifying and coupling an input signal to provide first and second outputs and a distortion monitoring section for processing the second output. The amount of distortion present is represented by an output from the distortion monitoring section of the system. The distortion monitoring section can include an envelope detector for receiving the second output signal, a lowpass filter coupled to the envelope detector for cutting off frequencies below the Nyquist rate, a voltage amplifier coupled to the lowpass filter for amplifying the signal, an analog to digital converter coupled to the voltage amplifier for digitizing the signal, a memory buffer coupled to the analog to digital converter for capturing digital data from the analog to digital converter, and a digital signal processor for analyzing the signal and computing distortion.

In another embodiment, the distortion monitoring section encompasses the envelope detector, lowpass filter, voltage amplifier, an analog to digital converter, memory buffer, digital signal processor, and a digital to analog converter coupled to the digital signal processor for converting the digital signal to analog and providing an analog output signal indicating distortion.

The digital signal processor can also encompass a spectral estimation algorithm such as a Fast Fourier Transform or the Maximum Entropy Method, or the All Poles Method for isolating the desired converted signal and for indicating the power of the converted signal, and an averager for averaging the amplitude of the beats around the converted signal. In another embodiment, the digital signal processor includes a digital filter coupled to the memory buffer and adapted to provide a very narrow digital band pass filter centered at the nominal beat, a squarer coupled to the digital filter for squaring the output, a summer coupled to the squarer for summing the output, and an averager coupled to the summer for averaging the output and providing the beat level and distortion level of the output. In yet another embodiment, the digital signal processor includes an on chip memory.

This invention takes advantage of the intermodulation products that occur in the CATV transmission system. The detection units are placed strategically throughout the transmission system to monitor distortion from key elements of the transmission system. For example, detection units can immediately follow RF amplifiers and optical receivers. In this way, the invention can be used to monitor the distortion introduced by the amplifiers, lasers, and optical amplifiers in the networks. Thus, this invention can monitor distortion wherever an electrical signal exists.

Objects of the invention include:

To provide a system that monitors system distortion without utilizing a pilot signal.

To provide a system that takes advantage of the intermodulation beats to monitor distortion.

To provide for use of a digital signal processing (DSP) arrangement which makes the system flexible for a variety of channel plans, such as, for example, Phase Alternating Line (PAL) system and Comite European de Normalization Electrique (CENLEC).

To provide a system where the frequency to be monitored is selectively determined by software, which does not require tuning, which simplifies the manufacturing process.

To provide an output signal in digital or analog form which can be transported anywhere in the transmission system.

To provide a system capable of detecting and selecting beats at low frequencies which enables sampling to be carried out at a low rate.

To provide an easily manufactured system.

Other objects and advantages of this invention will become apparent to those skilled in the art upon review of this document, the Figures and the claims.

DETAILED DESCRIPTION

FIGS. 2–6 show various aspects of a distortion monitoring system for CATV transmission network according to this invention.

As discussed in the Background of the Invention section in reference to FIG. 1, CATV systems 10 process satellite signals through a transmission network and ultimately are received by subscribers 26. Cable providers strive to provide a high quality signal to their subscribers 26. A relationship exists between providing a high quality signal at a maximum level (i.e. at the signal's crash point) and the introduction of distortion. A point exists where the optimum signal exists yet only a minimum of additional distortion is introduced into the system. Thus, this invention provides for monitoring distortion levels in a CATV system 10 such that the optimum signal level can be maintained.

This invention utilizes intermodulation beats to monitor overall system distortion. In a NTSC (National Television Standards Committee) channel plan, for example, the Composite Second Order (CSO) beats fall 1.25 MHz above carrier signal and 1.25 MHz below carrier signal. The level of these beats gives an indication of the overall level of distortion in a system. These beats, which are not necessarily coherent in phase, can be considered as sidebands with respect to any carrier signal given an equivalent Amplitude Modulated (AM) signal. Since the carrier signals are harmonically related, an envelope is formed by this modulation process, which can be detected by, for instance, an envelope detector. The beat signal at 1.25 MHz can be extracted and estimated using Digital Signal Processing (DSP) techniques. The distortion monitoring system of this invention utilized in a CATV system 10 can monitor and pinpoint where distortion exists. Thus, at each amplifier 22, or any component where an electrical signal exists, upon insertion of the distortion monitoring system, the distortion levels can be monitored.

Figure 2:
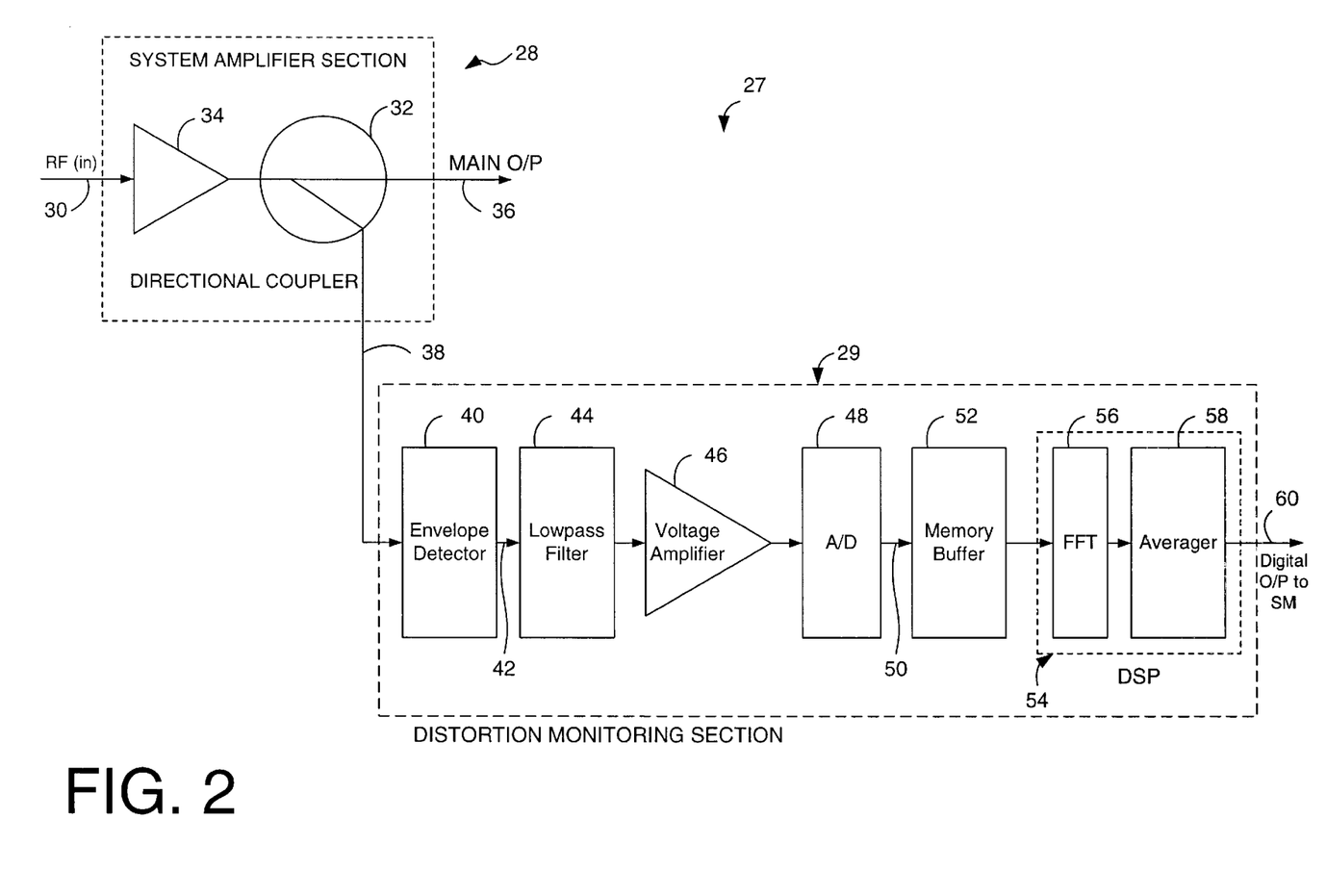
FIG. 2 shows a block diagram of a distortion monitoring system according to one aspect of this invention including a system amplifier section and a distortion monitoring section.

FIG. 2 shows an embodiment of the distortion monitoring system 27 of this invention. The distortion monitoring system 27 includes a system amplifier section 28 and a distortion monitoring section 29. In the system amplifier section 28, a RF signal 30 tapped by a directional coupler 32 at the output of a system amplifier 34, which could be a forward amplifier in coaxial transmission or an optical receiver in a fiber transmission. One output signal 36 is a main output and another output signal 38 feeds to the distortion monitoring section 29. The output signal 38 inputs into an envelope detector 40, the output 42 of which is applied to an anti-aliasing low pass filter 44, which cuts off at frequencies below the Nyquist rate. An appropriate voltage amplifier 46 precedes the Analog to Digital (A/D) converter 48, which digitizes the signal into digital data 50. The digital data 50 from the A/D converter 48 is captured in a memory buffer 52 for non-real time processing.

The digital data 50 is also processed by a digital signal processor (DSP) 54. A variety of DSP 54 algorithms can be used to process the data. For example, non-real time processing allows a low cost, low speed DSP 54 to do the necessary processing. The DSP 54 shown in FIG. 2 includes a Fast Fourier Transform (FFT) 56 and an averager 58. The data 50 is processed by the FFT 56 to isolate the 1.25 MHz component and indicate its power. Since the 1.25 MHz beats are incoherent in phase, their combined amplitude will vary over time. Therefore, an averaging routine is used to time average the amplitude of these beats.

In practice, the signal carriers drift in frequency over time, which consequently cause the beats to drift in frequency. The averaging routine, however, processes a range of frequencies around the nominal beat frequency. The output 60 from the DSP 54 shown in FIG. 2 is a digital value representing the amount of distortion present. This output can be digitally transported to anywhere in the transmission system, for status monitoring, for example, to the headend 14. The DSP 54 can be programmed with a predetermined threshold that outputs an alarm when this threshold is exceeded. A report indicating the location of the component and/or level of distortion can be prepared utilizing data from the output 60.

Figure 3:
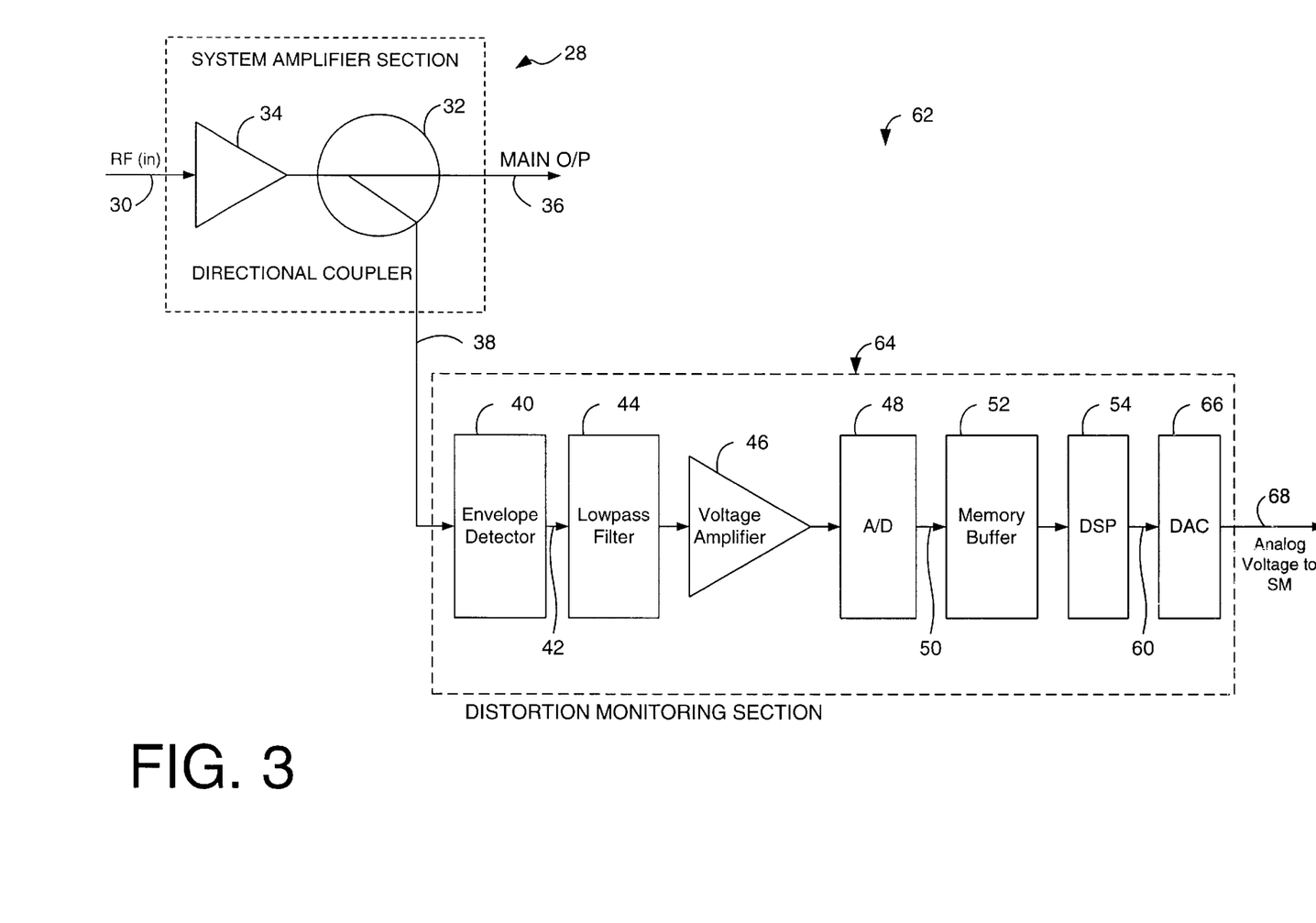
FIG. 3 shows a block diagram of a distortion monitoring system according to another aspect of this invention where the distortion monitoring section includes an analog to digital converter, memory buffer, digital signal processor and digital to analog converter.

FIG. 3 shows an alternative embodiment of the distortion monitoring system 62. The system amplifier section 28 contains the same components as the one in FIG. 2. The distortion monitoring section 64 contains an additional component at the output of the DSP 54. The digital output 60 of the DSP 54 is converted to analog form using a Digital to Analog Converter (DAC) 66. The analog signal 68 can be transmitted to a status monitoring station such as, for example, one located at the headend 14.

Figure 4:
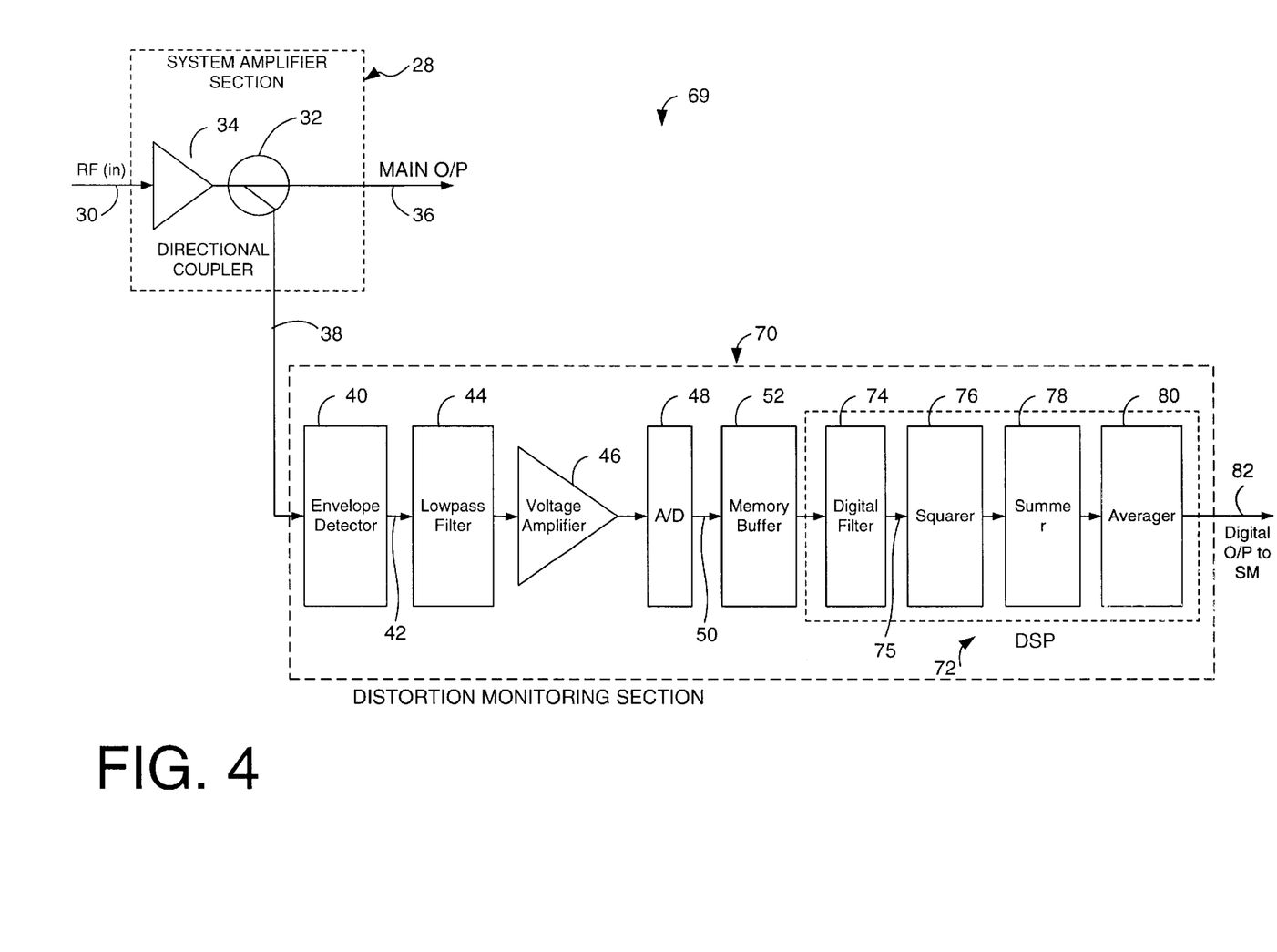
FIG. 4 shows a block diagram of a distortion monitoring system according to still another aspect of this invention where the digital signal processor of the distortion monitoring section includes a digital filter, squarer, summer and averager.

An alternative embodiment of this invention 69 is shown in FIG. 4. The system amplifier section 28 contains the same components as the one in FIG. 2. The distortion monitoring section 70 contains an alternative DSP 72. The DSP 72 includes a digital filter 74, a squarer 76, a summer 78 and an averager 80. The data from the memory buffer 50 is first filtered by a vary narrow Digital Band Pass Filter (DBPF) 74 centered at the nominal beat frequency of 1.25 MHz. The output 75 of the DBPF 74 is squared 76, summed 78, and averaged 80 to indicate the beat level and thus, the distortion level. The digital output 82 can be digitally transported for status monitoring as in FIG. 2.

Figure 5:
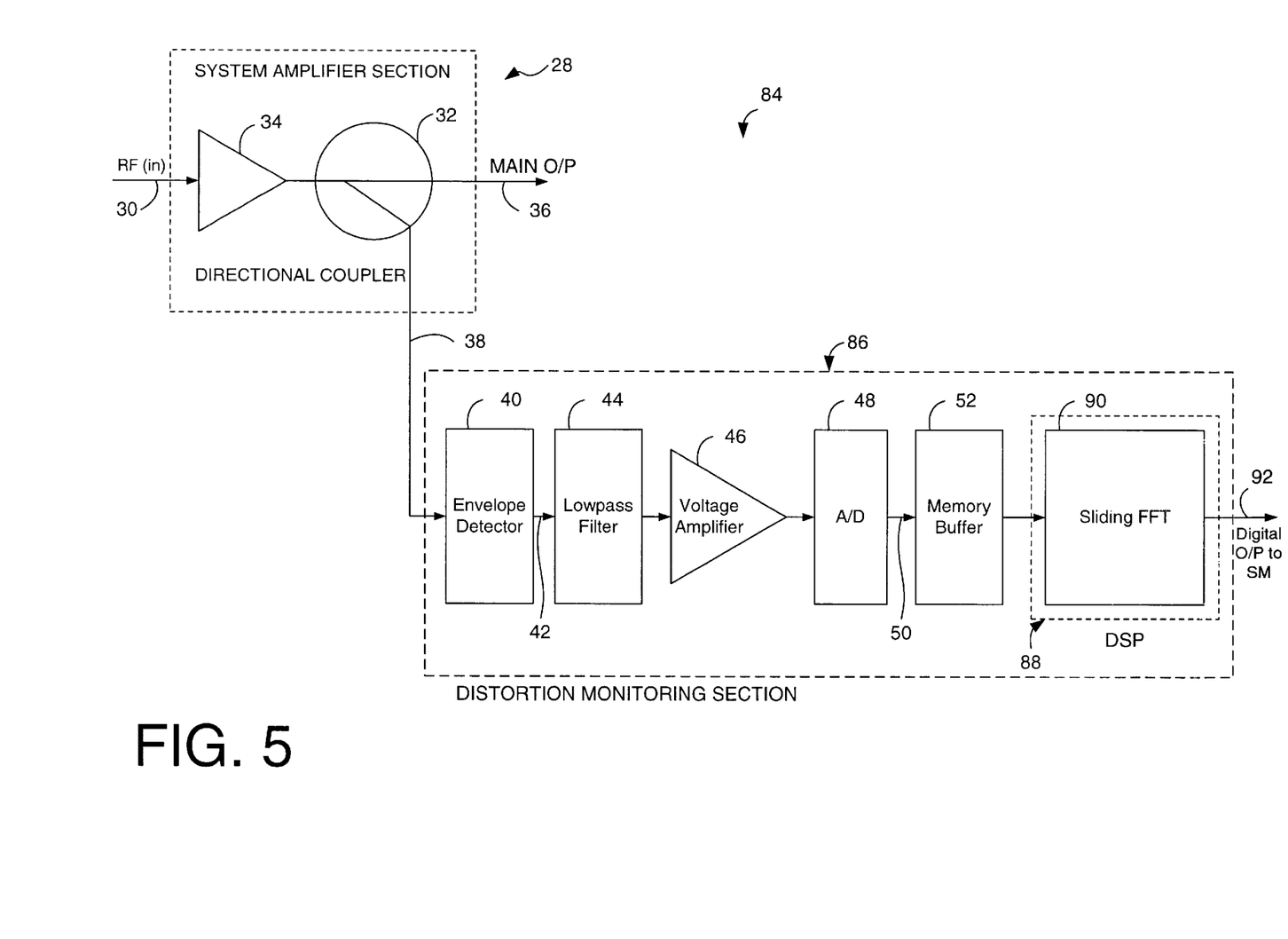
FIG. 5 shows a block diagram of a distortion monitoring system according to yet another aspect of this invention where the digital signal processor of the distortion monitoring section includes a sliding Fast Fourier Transform.

FIG. 5 shows another alternative embodiment of this invention 84. The system amplifier section 28 contains the same components as the one in FIG. 2. The distortion monitoring section 86 has a DSP 88 that includes a sliding Fast Fourier Transform (FFT) 90. The sliding FFT 90 algorithm processes the digital data 50 to provide an output 92 which represents the signal level in a narrow band centered around the beat frequency of 1.25 MHz.

Figure 6:
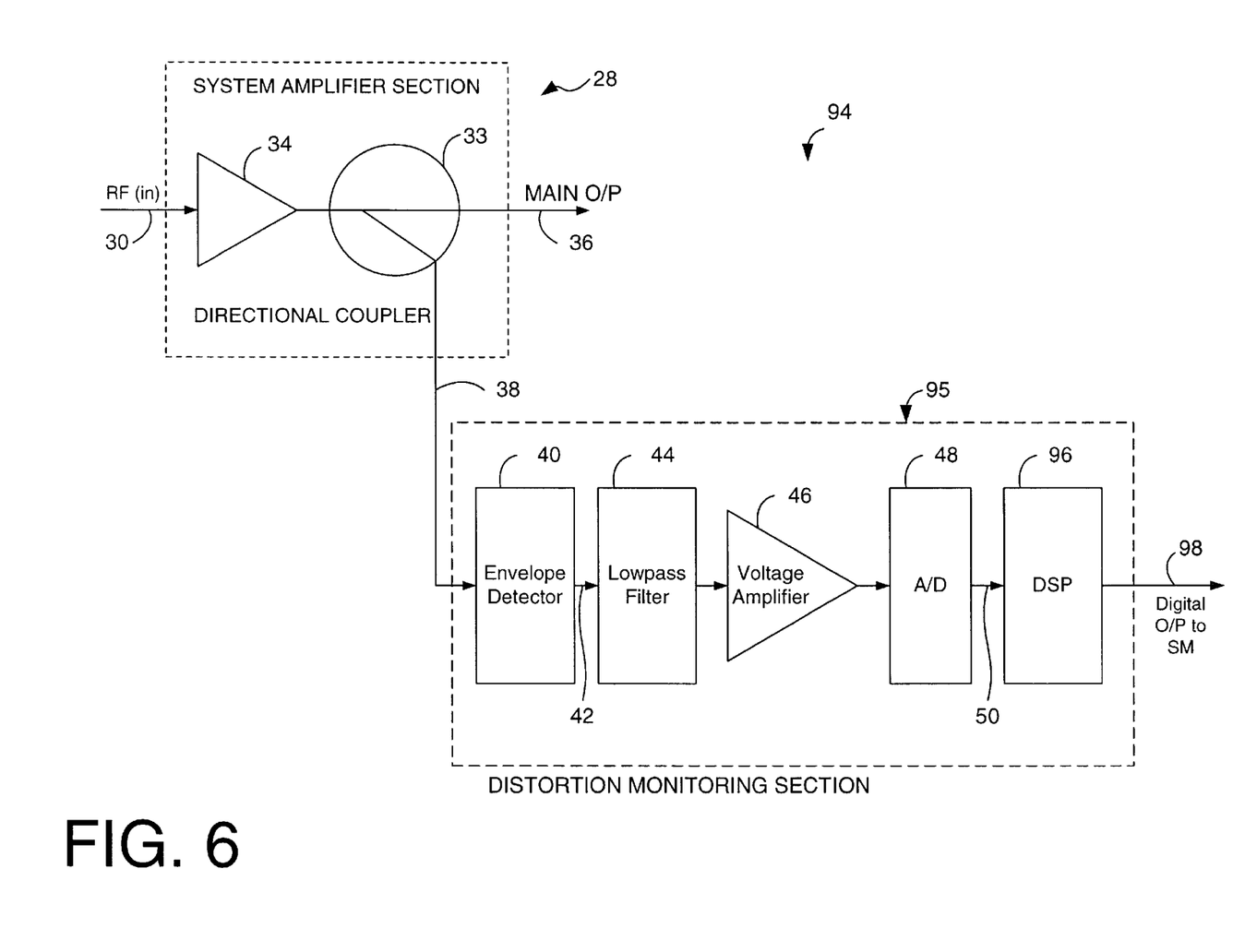
FIG. 6 shows a block diagram of a distortion monitoring system according to another aspect of this invention where the digital signal processor of the distortion monitoring section includes an on chip memory.

FIG. 6 shows still another alternative embodiment of this invention 94. The system amplifier 28 contains the same components as the one in FIG. 2. The distortion monitoring section 95 includes a DSP 96 having an on-chip or internal memory (not shown). Suitable DSP chips 96 containing internal memory can be utilized with this invention to eliminate the requirement for the external memory buffer 52. The digital output 98 can be monitored by transporting the digital data to an appropriate system manager.

An advantage of this invention is that the DSP configuration allows the CSO beats, and/or the Composite Triple Beats (CTB) at any frequency spacing from the carrier, for other channel plans, to be monitored. Thus, monitoring the distortion of different channel plans is possible with a simple software change in the DSP algorithm.

In light of the foregoing disclosure of this invention and description of certain preferred embodiments, those who are skilled in this area of technology will readily understand that various modifications and adaptations can be made without departing from the true scope and spirit of this invention. All such modifications and adaptations are intended to be covered by the following claims.

What is claimed is:

1. A distortion monitoring system, comprising:
    a system amplifier section for amplifying and coupling an input signal to provide a first and second output; and
    a distortion monitoring section for processing the second output to provide a third output representing an amount of distortion present, wherein the distortion monitoring section comprises:
        an envelope detector for receiving the second output signal;
        a lowpass filter coupled to the envelope detector for cutting off frequencies below a Nyquist rate and for outputting a signal;
        a voltage amplifier coupled to the lowpass filter for amplifying the signal;
        an analog to digital converter coupled to the voltage amplifier for digitizing the signal;
        a memory buffer coupled to the analog to digital converter for capturing digital data from the analog to digital converter; and
        a digital signal processor for extracting a converted signal.

2. The distortion monitoring system of claim 1, wherein the system amplifier section includes at least one system amplifier for receiving the input signal and a directional coupler at an output of the system amplifier.

3. The distortion monitoring system of claim 1, wherein the input signal comprises a radio frequency.

4. The distortion monitoring system of claim 2, wherein the system amplifier comprises a forward amplifier in a coaxial transmission system.

5. The distortion monitoring system of claim 2, wherein the system amplifier comprises an optical receiver in a fiber transmission system.

6. The distortion monitoring system of claim 1, wherein the digital signal processor further comprises:
    a Fast Fourier Transform for isolating the converted signal and for indicating the power of the converted signal; and
    an averager for averaging the amplitude of the beats around the converted signal.

7. The distortion monitoring system of claim 1, wherein the distortion monitoring section further comprises:
    a digital to analog converter coupled to the digital signal processor for converting the digital signal to analog and providing an analog output signal.

8. The distortion monitoring system of claim 1, wherein the digital signal processor further comprises:
    a digital filter coupled to the memory buffer and adapted to provide a narrow digital band pass filter centered at a nominal beat frequency;
    a squarer coupled to the digital filter for squaring the output;
    a summer coupled to the squarer for summing the output; and
    an averager coupled to the summer for averaging the output and providing the beat level and distortion level of the output.

9. The distortion monitoring system of claim 1, wherein the digital signal processor further comprises a sliding Fast Fourier Transform coupled to the memory buffer for processing the digital output and providing an output representing a signal level in a narrow band centered around the selected beat frequency.

10. The distortion monitoring system of claim 1, further comprising a status monitoring system coupled to the third output.

11. The distortion monitoring system of claim 1, further comprising a status monitoring system coupled to the third output.

12. The distortion monitoring system of claim 8, further comprising a status monitoring system coupled to the analog output signal.

13. A communications system, comprising:
    a headend section for transmitting a cable signal over a communications medium;
    a system amplifier section for amplifying the cable signal and providing at least main and auxiliary outputs;
    a distortion monitoring section for processing the auxiliary output to provide a third output representing an amount of distortion present; and
    taps coupled to the main output of the system amplifier section for routing the main output to subscribers,
    wherein the distortion monitoring section further comprises:
        an envelope detector for receiving the auxiliary output signal;
        a lowpass filter coupled to the envelope detector for cutting off frequencies below a Nyquist rate and for outputting a signal;
        a voltage amplifier coupled to the lowpass filter for amplifying the signal;
        an analog to digital converter coupled to the voltage amplifier for digitizing the signal;
        a memory buffer coupled to the analog to digital converter for capturing digital data from the analog to digital converter; and
        a digital signal processor for extracting a converted signal.

14. The communications system of claim 13, wherein the system amplifier section includes at least one system amplifier for receiving the cable signal and a directional coupler at an output of the system amplifier.

15. The communications system of claim 13, wherein the cable signal comprises a radio frequency.

16. The communications system of claim 14, wherein the system amplifier comprises a forward amplifier in a coaxial transmission system.

17. The communications system of claim 14, wherein the system amplifier comprises an optical receiver in a fiber transmission system.

18. The communications system of claim 13, wherein the digital signal processor further comprises:

a Fast Fourier Transform for isolating the converted signal and for indicating the power of the converted signal; and an averager for averaging the amplitude of the beats around the converted signal.

19. The communications system of claim 13, wherein the digital signal processor further comprises:

an averager for averaging the amplitude of the beats around the converted signal; and a spectral estimation algorithm selected from the group consisting of a maximum entropy method, an all poles method and other spectral estimation algorithms for isolating the converted signal and for indicating the power of the converted signal.

20. The communications system of claim 13, wherein the distortion monitoring section further comprises:

a digital to analog converter coupled to the digital signal processor for converting the digital signal to analog and providing an analog output signal.

21. The communication system of claim 13, wherein the digital signal processor further comprises a digital filter coupled to the memory buffer and adapted to provide a narrow digital band pass filter centered at a nominal beat frequency;

a squarer coupled to the digital filter for squaring the output;

a summer coupled to the squarer for summing the output; and an averager coupled to the summer for averaging the output and providing the beat level and distortion level of the output.

22. The distortion monitoring system of claim 13, wherein the digital signal processor further comprises a sliding Fast Fourier Transform coupled to the memory buffer for processing the digital output and providing an output representing a signal level in a narrow band centered around the selected beat frequency.

23. The communications system of claim 13, further comprising a status monitoring system coupled to the third output.

24. The communications system of claim 13, further comprising a status monitoring system coupled to the third output.

25. The distortion monitoring system of claim 21, further comprising a status monitoring system coupled to the analog output signal.

* * * * *

UNITED STATES PATENT AND TRADEMARK OFFICE
CERTIFICATE OF CORRECTION

PATENT NO.    : 6,556,239 B1
DATED         : April 29, 2003
INVENTOR(S)   : Al-Araji et al.

It is certified that error appears in the above-identified patent and that said Letters Patent is hereby corrected as shown below:

<u>Title page,</u>
Item [74], *Attorney, Agent, or Firm*, please correct the names to read as follows:
-- Hubert J. Barnhardt III; Kenneth M. Massaroni; Shelley L. Couturier --.

<u>Column 7,</u>
Line 26, delete "communication" and insert therefore -- communications --

Signed and Sealed this

Sixteenth Day of September, 2003

JAMES E. ROGAN
*Director of the United States Patent and Trademark Office*